April 18, 1950  J.-F. ERNST  2,504,511

TRACTION DEVICE

Filed Feb. 16, 1948

Inventor

Joseph F. Ernst

By Shepherd & Campbell

Patented Apr. 18, 1950

2,504,511

UNITED STATES PATENT OFFICE 2,504,511

TRACTION DEVICE

Joseph Fillmore Ernst, Youngstown, Ohio

Application February 16, 1948, Serial No. 8,510

9 Claims. (Cl. 301—47)

This invention relates to improvements in auxiliary traction devices for vehicles. More particularly it is concerned with the retractable auxiliary wheel type of device adapted to be associated with the vehicle drive wheels and so constructed and arranged that it may be thrust into operative position when occasion requires.

An object of the invention is to provide an auxiliary traction device which may be operated from a point convenient to the operator of the vehicle, for example the dash board or the floor board, and which may be quickly and positively put into operation.

Another object of the invention is to provide an auxiliary traction device which will not interfere with normal operation of the vehicle but which is available for instant use when the vehicle is skidding or to provide additional traction when the vehicle is attempting to traverse a layer of snow or an icy, muddy or other slippery surface.

Still another object is to provide traction apparatus in the form of a wheel which when placed in operation will be substituted for the ordinary drive wheels of the vehicle.

A further object is to provide a device constructed of a minimum number of parts and which is extremely durable and efficient in operation.

Other objects and advantages of the invention will be apparent from the following detailed description taken in conjunction with the accompanying drawings wherein a preferred embodiment of the principles of the invention has been selected for exemplification.

Figure 1:
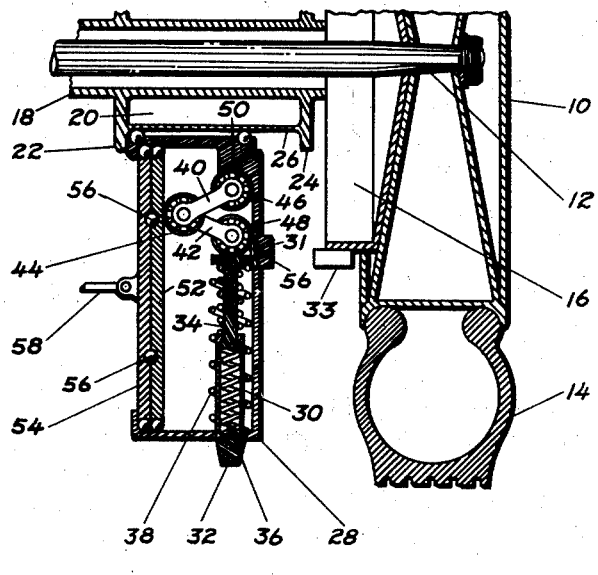
Fig. 1 is a fragmentary transverse sectional view of a vehicle wheel and axle having a traction device constructed in accordance with the present invention attached thereto and showing the traction fingers in retracted position.

Referring more particularly to the drawings, wherein like numerals refer to like parts, 10 represents any conventional wheel for an automobile or the like secured to the extremity of a driving axle 12 and carrying at its periphery a pneumatic tire 14. A brake drum 16 extends inwardly of the wheel 10 and is rotatable therewith in the usual manner.

Coming now to the improvements specifically contemplated by the present invention, the housing 18 for the axle 12 is integrally or otherwise provided with an annular collar 20 having end flanges 22 and 24, respectively, which bound an elongated intermediate bearing surface 26. Mounted for free rotation on the collar 20 is a containing ring designated in its entirety at 28 which forms a housing for the traction fingers and actuating mechanism. Inwardly extending annular flanges 27 and 29 are provided at the open end of containing ring 28, as shown. At the opposed outer side of containing ring 28 lugs 31 are provided for engagement with lugs 33 carried by a rotatable part of the wheel 10 whereby the wheel will impart its rotary movement to the containing ring as the lugs are shifted into engagement.

Supported in apertures provided at spaced intervals in the outer peripheral wall of containing ring 28 are a plurality of traction fingers 30, each carrying a tip of antifriction material, preferably a rubber tread 32, of frusto-conical configuration. The traction fingers 30 are shell shaped, as shown, each receiving an operating plunger 34 having annular inner and outer flanged ends.

A shock spring 36 is compressed, as shown, between the outer flanged end of plunger 34 and the closed extremity of finger 30 and a retracting spring 38 encircles each finger 30 and plunger 34 bearing between the inner flanged end of the plunger and the surface of the outer peripheral wall of containing ring 28. It will be apparent that the shock springs 36 impart a certain resiliency to the fingers 30 and that the retracting springs 38 tend to urge the fingers 30 into the retracted position shown in Fig. 1.

For actuating each of the fingers 30, cooperating cam or toggle arms 40 and 42 are journalled together at adjacent ends, as shown, and carry at their extremities bearing races 44, 46 and 48, respectively. An arcuate seat 50 for the bearing race 46 of arm 40 is provided adjacent the inner peripheral wall of containing ring 28 and the bearing race 48 of arm 42 seats against the inner flanged end of plunger 34, as shown. This arrangement causes the pivotally connected arms 40 and 42 to act as toggles in exerting forcible thrust upon plunger 34 to move it outwardly against the action of spring 38, whenever the pivoted ends of these arms are thrust bodily laterally from the position of Fig. 2 to the position indicated in Fig. 3.

For operating the cam arms 40 and 42 an annular bearing disk 52 is mounted within containing ring 28 for rotation therewith and a portion thereof is in constant engagement with bearing race 44 common to the cam arms 40 and 42. A fixed actuating disk 54 bears against the disk 52 through the medium of antifriction devices such as the bearings 56, as shown. When the fixed actuating disk 54 is thrust outwardly toward the end of the axle from the normal retracted position of the parts, as shown in Fig. 1, the rotatable disk 52 which bears against the race 44 will similarly shift to urge cam arms 40 and 42 into the extended position shown in Fig. 2 thus to thrust the fingers 30 radially outwardly of the containing ring 28 so that the traction tips 32 thereof project a slight distance beyond the periphery of the automobile tire 14. An arcuate spring 56 is positioned to abut bearing race 44 when the cam arms 40 and 42 are in the extended position shown in Fig. 2 and serves as a starting means abruptly to return the fingers 30 to retracted position when the disks 52 and 54 are withdrawn inwardly.

Figure 2:
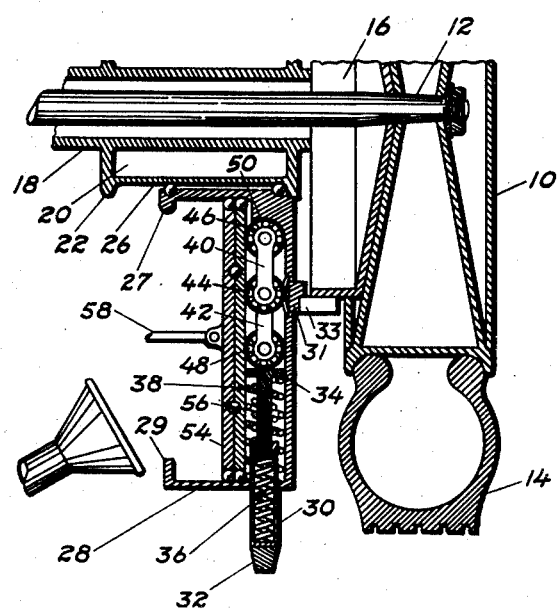
Fig. 2 is a view similar to Fig. 1 but showing the traction fingers projected into operative position.
Figure 3:
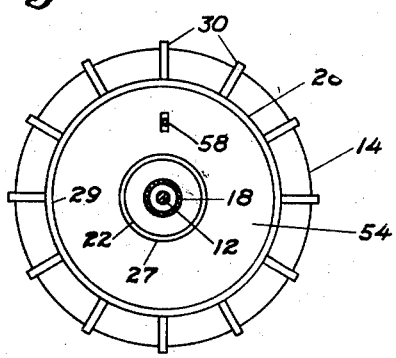
Fig. 3 is a side elevational view taken from the rear or inner side of the entire device illustrated in fragment in Figs. 1 and 2 and looking outwardly of the axle toward the vehicle wheel further showing the traction fingers projected outwardly into operative position.

An actuating rod or lever for the device is shown in fragment at 58 as secured to the actuating disk 54 and is adapted to be shifted axially so that the parts will assume either of the relative positions shown in Figs. 1 and 2, respectively, from a point convenient to the operator of the vehicle, for example the dash board or floor board through a linkage system or hydraulic means in a manner well known in the art and which is not therefor illustrated in detail.

The exhaust jet shown at the lower left hand corner of Fig. 2 is for the purpose of directing hot exhaust gases from the vehicle engine toward the operating parts of the device to prevent freezing.

It will be understood that the precise construction herein illustrated and described is exemplary only of the principles of the present invention which contemplate such modified constructions and arrangement of parts as are within the scope of the following claims.

1. An auxiliary vehicle drive wheel which comprises, a containing ring mounted on the vehicle axle adjacent the normal vehicle drive wheel, said ring being mounted for free rotation with respect to said axle and also being mounted for movement lengthwise of said axle toward and from the normal vehicle drive wheel, members carried by the normal vehicle drive wheel and the containing ring which interengage to effect a driving connection between said wheel and ring when the ring is moved toward the wheel to a predetermined degree, a plurality of radially disposed traction fingers mounted in the outer peripheral wall of the containing ring, means tending to retract said fingers and draw them into the ring, a common actuating member for the traction fingers and for the containing ring, elements actuated by said actuating member for thrusting the traction fingers radially outward, movement of said common actuating member also bodily shifting the containing ring toward the normal drive wheel to effect driving engagement between said ring and wheel.

2. The combination with a normal vehicle drive wheel and its axle and axle housing, of a containing ring mounted upon said axle housing and comprising a peripheral wall, a plurality of radially disposed traction fingers supported in said peripheral wall each carrying an actuating plunger, a toggle structure associated with each of said fingers, said toggle structures each comprising a pair of toggle arms pivotally connected at their adjacent ends, the opposite ends of said arms engaging respectively with an inner portion of the containing ring and with the plungers of the traction fingers, a plate bearing against all of the toggle structures at the point of pivotal engagement of the toggle arms with each other, means for mounting said plate for bodily movement toward the toggle structures, and means for so moving said plate.

3. A structure as recited in claim 2 in combination with means for mounting the containing ring to slide lengthwise with respect to the axle housing and interengaging lugs upon the ring and normal drive wheel whereby such bodily movement of the ring effects driving engagement between ring and normal drive wheel.

4. A structure of the character described comprising a containing ring having a peripheral wall, an axle housing upon which said ring is mounted for rotation, a plurality of traction fingers radially mounted in said peripheral wall, a toggle structure associated with each of said fingers, each toggle structure comprising a pair of toggle arms pivotally connected together at their adjacent ends, the outer end of the inner of said arms thrusting against an inner portion of the containing ring and the outer end of the outer of said arms thrusting against said traction fingers when the arms are moved in a direction to cause them to align with each other.

5. A structure as recited in claim 4 wherein the fingers comprise tubular members, plungers in said tubular members, cushioning springs bearing between said plungers and the tubular members and retracting springs bearing between the peripheral wall of the ring and portions of said plungers and tending to draw the tubular members into the containing ring.

6. A structure as recited in claim 4 in combination with a plate mounted for rotation in the ring and bearing against all of the toggle structures at the points of pivotal engagement of the arms of the several toggle structures and means for moving said plate toward the toggle structures to simultaneously move the arms of all of the toggle structures into alignment with each other.

7. A structure as recited in claim 6 in combination with a nonrotative plate lying close to the first named plate, anti-friction devices between said plates and a manually operable element for thrusting said nonrotative plate toward the first named plate.

8. A structure as recited in claim 4 in combination with a plate mounted for rotation in the ring and bearing against all of the toggle structures at the points of pivotal engagement of the arms of the several toggle structures and means for moving said plate toward the toggle structures to simultaneously move the arms of all of the toggle structures into alignment with each other, and means for mounting the containing ring and the contained parts to move bodily along the axle housing, driving elements upon said ring and a normal driving wheel having complemental driving elements of the ring engageable under such bodily movement.

9. The combination with a vehicle normal drive wheel and its axle, of an elongated bearing portion upon said axle, a containing ring mounted to turn and to slide lengthwise on said elongated bearing toward and from the normal drive wheel, said ring comprising a peripheral wall, a plurality of radially disposed traction fingers supported within the ring each of which comprises a tubular portion which projects through an aperture of said peripheral wall, a plunger having heads at its opposite ends one of which heads of each plunger is slidably disposed in said tubular portion of a finger, retracting springs bearing between said peripheral wall of the ring and the heads at the other ends of the several plungers, cushioning springs in the tubular portions of the fingers bearing between the outer ends of said tubular portions and the ends of the respective plungers, a toggle structure associated with each finger for thrusting the same forcibly outward, each toggle structure comprising a pair of arms, pivotally connected at confronting ends thereof the other end of one of said arms having rolling engagement with a seat formed on the inner portion of said ring and the other end of the other of said arms bearing against the inner end of the plunger of the associated traction finger, anti-friction ball bearing devices at the ends of the several toggle arms, a plate carried by the ring and rotating therewith and bearing against all of the ball bearing devices at the confronting ends of the several toggle arms and a manually operable element for thrusting said plate sidewise to move the toggle arms into alignment with each other and to move the ring toward the normal drive wheel, and interlocking elements upon the ring and drive wheel, brought into driving engagement by such movement of the ring toward the drive wheel.

JOSEPH FILLMORE ERNST.

REFERENCES CITED

The following references are of record in the file of this patent:

UNITED STATES PATENTS

| Number | Name | Date |
|---|---|---|
| 1,385,108 | Barletts | July 19, 1921 |
| 2,229,830 | White | Jan. 28, 1941 |

FOREIGN PATENTS

| Number | Country | Date |
|---|---|---|
| 679,104 | Germany | July 6, 1939 |